(12) United States Patent
Kodera

(10) Patent No.: US 11,967,877 B2
(45) Date of Patent: Apr. 23, 2024

(54) ROTATING ELECTRIC MACHINE

(71) Applicant: Mitsubishi Electric Corporation, Tokyo (JP)

(72) Inventor: Daiki Kodera, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 345 days.

(21) Appl. No.: 17/595,863

(22) PCT Filed: Jun. 28, 2019

(86) PCT No.: PCT/JP2019/025931
§ 371 (c)(1),
(2) Date: Nov. 29, 2021

(87) PCT Pub. No.: WO2020/261561
PCT Pub. Date: Dec. 30, 2020

(65) Prior Publication Data
US 2022/0247262 A1 Aug. 4, 2022

(51) Int. Cl.
*H02K 5/20* (2006.01)
*H02K 3/42* (2006.01)
*H02K 9/06* (2006.01)
*H02K 9/10* (2006.01)

(52) U.S. Cl.
CPC ............... *H02K 5/20* (2013.01); *H02K 3/42* (2013.01); *H02K 9/06* (2013.01); *H02K 9/10* (2013.01)

(58) Field of Classification Search
CPC ............. H02K 5/20; H02K 9/06; H02K 9/10
See application file for complete search history.

(56) References Cited

U.S. PATENT DOCUMENTS

| 4,208,599 A | 6/1980 | Armor et al. |
| 2022/0247262 A1* | 8/2022 | Kodera ............... H02K 9/10 |

FOREIGN PATENT DOCUMENTS

| JP | S54139006 A | 10/1979 |
| JP | S558294 A | 1/1980 |
| JP | S5937864 A | 3/1984 |

(Continued)

OTHER PUBLICATIONS

Office Action dated Sep. 27, 2023, issued in the corresponding Chinese Patent Application No. 201980097450.8, 10 pages including 3 pages of English Translation.

(Continued)

*Primary Examiner* — Robert W Horn
(74) *Attorney, Agent, or Firm* — BUCHANAN INGERSOLL & ROONEY PC

(57) ABSTRACT

An end housing portion of a rotating electric machine is partitioned by a partition plate into a first space on the side where a cooling cooler is present and a second space on the side where a coil end portion is present. The partition plate has, at a radially outer end, an intake port that opens in the circumferential direction. A shield plate which is a magnetically high-conductive metal plate is provided so as to be connected to the radially inner side from the intake port of the partition plate and arranged along the circumferential direction of the frame. A ventilation path D is formed between the shield plate and the frame so as to communicate with the intake port.

2 Claims, 5 Drawing Sheets

(56) References Cited

FOREIGN PATENT DOCUMENTS

JP          2016-036234 A     3/2016

OTHER PUBLICATIONS

International Search Report (PCT/ISA/210) with English translation and Written Opinion (PCT/ISA/237) dated Aug. 27, 2019, by the Japanese Patent Office as the International Searching Authority for International Application No. PCT/JP2019/025931.

\* cited by examiner

ROTATING ELECTRIC MACHINE

TECHNICAL FIELD

The present disclosure relates to a rotating electric machine.

BACKGROUND ART

In a rotating electric machine, particularly in a large-sized rotating electric machine such as a turbine electric generator, the temperatures of a stator winding, a stator core, and the like increase due to electric loss and mechanical loss. In such a rotating electric machine, a cooling gas in the rotating electric machine is circulated by a fan attached to a rotor to cool a temperature increased part, and is cooled by a gas cooler. For example, in a rotating electric machine in which one of a bearing bracket and a stator frame covering a stator winding end is made of magnetic metal, the part made of the magnetic metal is covered from the inner sloe by a shield plate which is a high-conductive metal plate, a cooling passage for passing a cooling medium is provided inside the shield plate, and pipes for supplying and discharging the cooling medium are provided to the cooling passage, thereby preventing heating of the bracket and the like (see Patent Document 1).

CITATION LIST

Patent Document

Patent Document 1: Japanese Laid-Open Patent Publication No. 59-37864 (page 1, FIG. 1)

SUMMARY OF THE INVENTION

Problems to be Solved by the Invention

As described above, the magnetic metal near the stator winding is heated by a leakage magnetic flux, and therefore, for example, in Patent Document 1, the inner side of the bracket is covered by the shield plate which is a high-conductive metal plate so as to prevent overheating. Meanwhile, in recent years, rotating electric machines are required to have a space-saving structure and an increased output and thus the frame needs to be down sized. However, if the frame and the stator winding are located close to each other, the frame is overheated. Therefore, further measures for preventing overheating of the frame are needed.

The present disclosure has been made to solve the above problem, and an object of the present disclosure is to provide a rotating electric machine in which a shield plate provided between a frame and a stator winding is forcibly cooled, thus enhancing a franc cooling effect and enabling size reduction.

Solution to the Problems

A rotating electric machine according to the present disclosure includes: a rotor having a columnar rotor core which is fixed to a shaft and generates a magnetic field; a stator provided so as to surround a circumference of the rotor core, end composed of a stator core end a coil wound through slots of the stator core; and a frame storing the stator and the rotor. A space in which a coil end portion of the coil extending in an axial direction front the stator core is surrounded by the frame and an axial-direction end surface of the stator core is defined as an end housing portion. The end housing portion is partitioned by a partition plate into a first space on a side where a cooler for cooling a coding gas circulating in the rotating electric machine is present, and a second space on a side where the coil end portion is present. The partition plate has, at a radially outer end, an intake port that opens in a circumferential direction. A shield plate which is a magnetically high-conductive metal plate is provided so as to be connected to a radially inner side from the intake port of the partition plate and arranged along the circumferential direction of the frame. A ventilation path is formed between the shield plate and the frame so as to communicate with the intake port.

Effect of the Invention

In the rotating electric machine according to the present disclosure, the shield plate provided between the frame and the stator winding is forcibly cooled, thus providing a rotating electric machine that has an enhanced frame cooling effect and a reduced size.

DESCRIPTION OF EMBODIMENTS

Embodiment 1

Hereinafter, a rotating electric machine according to embodiment 1 will be described with reference to the drawings.

Figure 1:
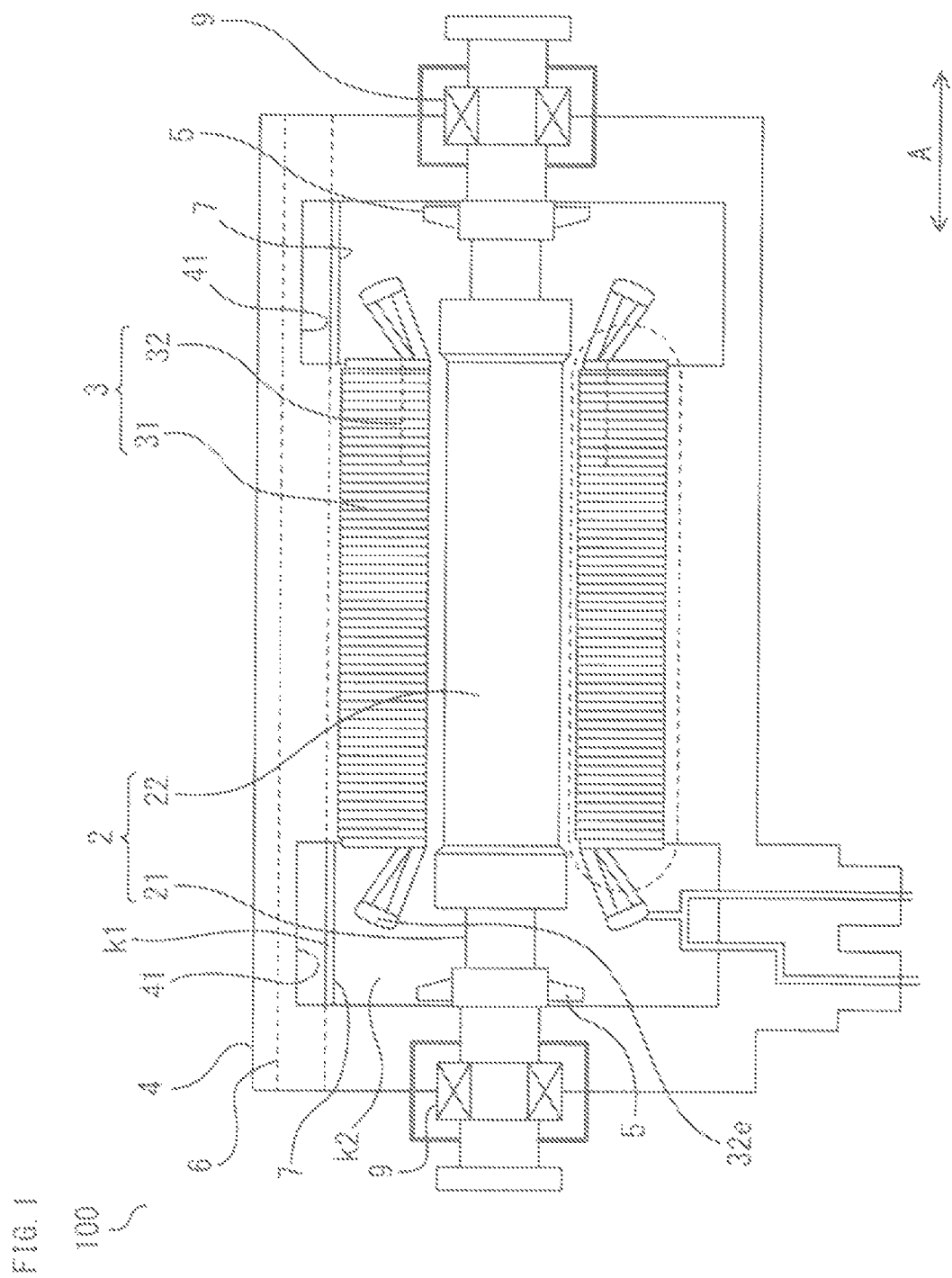
FIG. 1 is a sectional view of a rotating electric machine according to embodiment 1.

FIG. 1 is a sectional view of a rotating electric machine 100 according to embodiment 1.

The rotating electric machine 100 includes a rotor 2 having a columnar rotor core 22 which is fixed to a shaft 21 and generates a magnetic field, and stator 3 provided so as to surround the circumference of the rotor core 22.

The stator 3 includes a cylindrical stator core 31 and a coil 32 wound through slots (not shown) of the stator core 31. The rotor 2 and the stator 3 are stored in a frame 4. The shaft 21 of the rotor 2 is rotatably supported by bearings 9 attached at both ends in the axial direction of the frame 4.

Of the coil 32, a part extending in the axial direction from each axial-direction end surface of the stator core 31 is referred to as coil end portion 32e. A space in which each coil end portion 32e is surrounded by the frame 4 and the axial-direction end surface of the stator core 31 is referred to as end housing portion 41.

Figure 2:
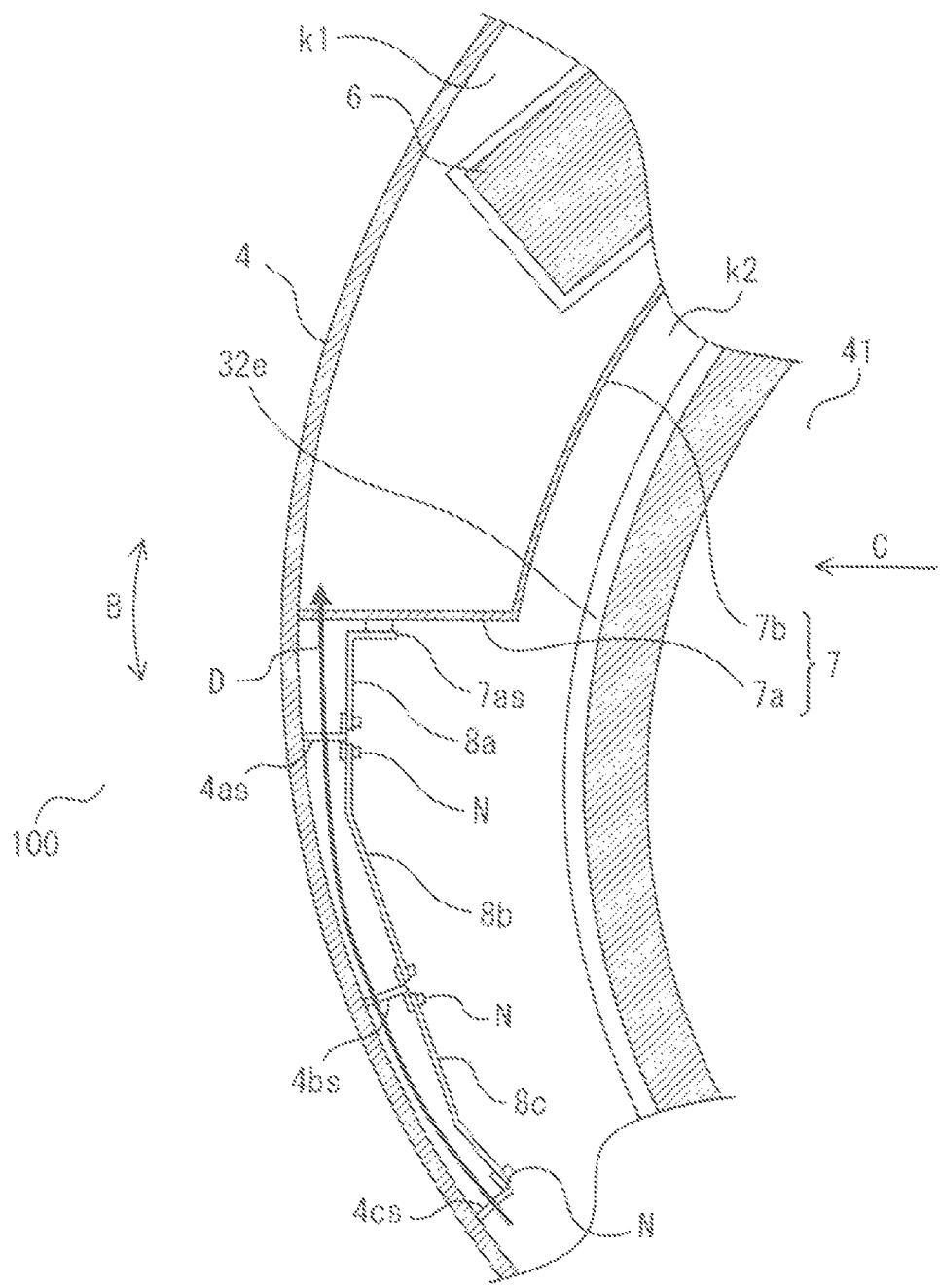
FIG. 2 is a specific part sectional view at one end in the axial direction of the rotating electric machine according to embodiment 1, taken along a direction perpendicular to the axial direction.

FIG. 2 is a specific part sectional view at one end in the axial direction of the rotating electric machine 100, taken along a direction perpendicular to the axial direction A. The cross-section position is a part where the coil end portion 32e is present. A cooler 6 is a device for cooling a cooling gas that circulates in the rotating electric machine 100 and cools the rotor 2 and the stator 3, through heat exchange with the outside or the rotating electric machine 100.

The end housing portion 41 is partitioned by a partition plate 7 into a first space k1 on the side where the cooler 6 is present and a second space k2 on the side where the coil end portion 32a of the stator 3 is present. That is, the first space k1 and the second space, k2 are surrounded by the partition plate 7 and the frame 4.

The partition plate 7 includes a first partition wall 7a extending in the radial direction and a second partition wall 7b extending in the circumferential direction.

Figure 3:
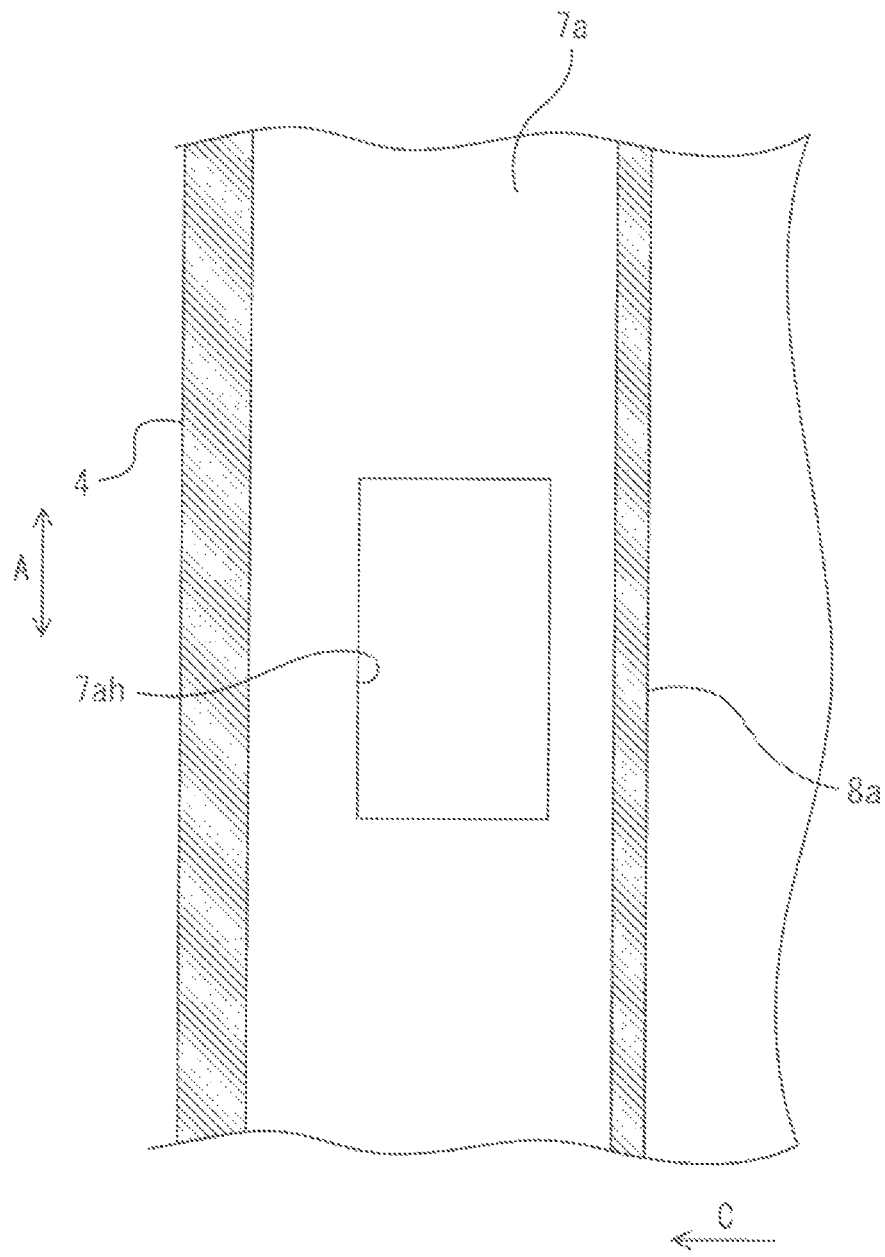
FIG. 3 is a specific part enlarged view of a first partition wall according to embodiment 1, as seen in the circumferential direction shown in FIG. 2.

FIG. 3 is a specific part enlarged view of the first partition wall 7a as seen in the circumferential direction B shown in FIG. 2.

The first partition wall 7a has, at an outer end in the radial direction C of the rotating electric machine 100 shown in FIG. 2, an intake port 7ah that opens in the circumferential direction B, as shown in FIG. 3. Through the intake port 7ah, the cooling gas in the second space k2 is sucked into the first space k1.

Figure 4:
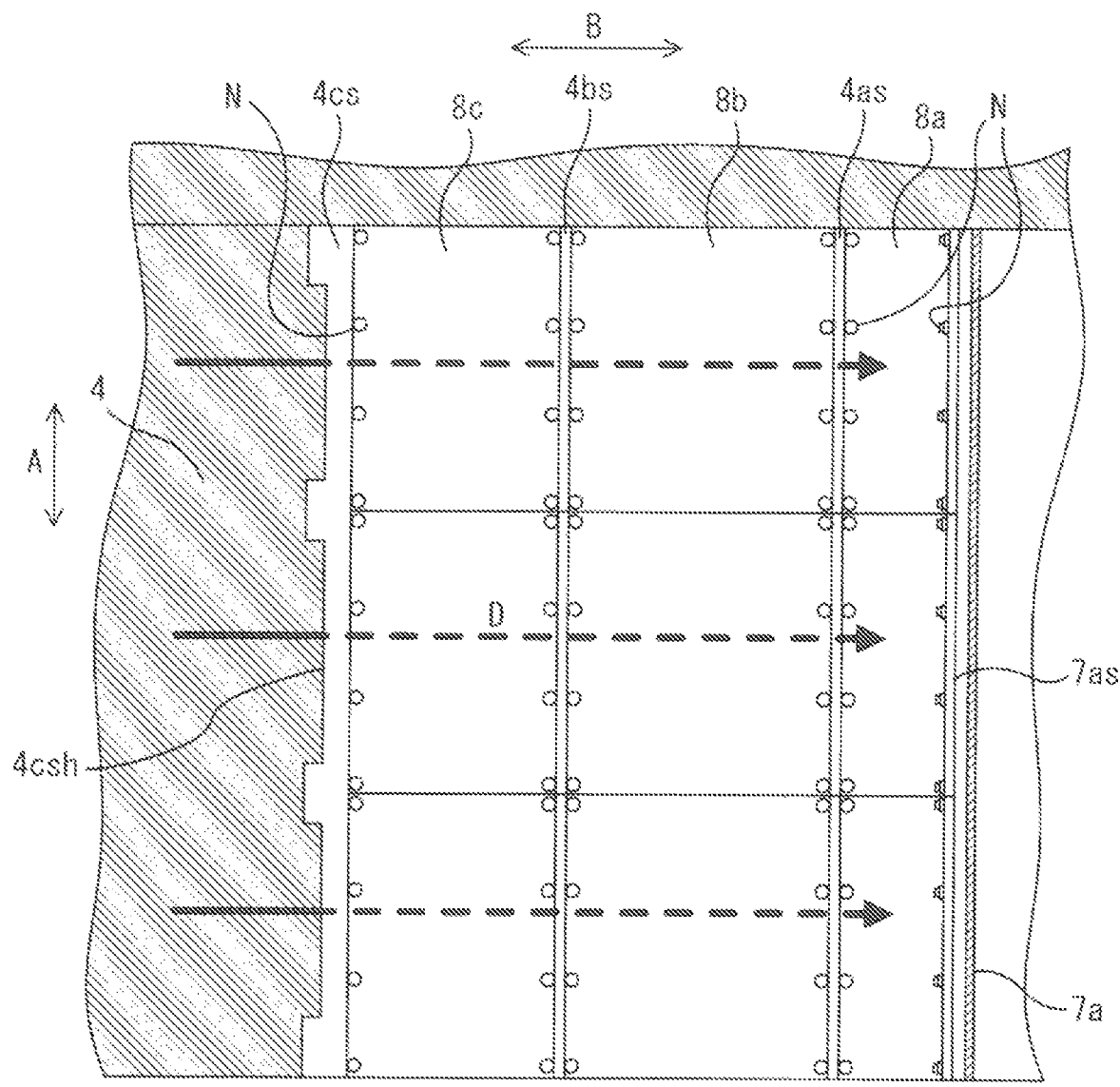
FIG. 4 is a schematic front view of a shield plate according to embodiment 1, as seen in the radial direction from the inside of the rotating electric machine.

FIG. 4 is a schematic front view of shield plates 8a, 8b, 8c of the rotating electric machine 100 as seen in the radial direction C shown in FIG. 2. On the second space k2 side at the part where the intake port 7ah is present, the shield plates 8a, 8b, 8c are provided so as to be connected to the radially inner side from the intake port 7ah of the first partition wall 7a and arranged in a predetermined range along the circumferential direction B at the frame 4. The shield plates 8a to 8c are magnetically high-conductive metal plates. The shield plates 8a to 8c serve to reduce heat generation in the frame due to a leakage magnetic flux from the coil end portion 32e, by means of heat generation in the shield plates 8a to 8c. The division number of the shield plates 8a to 8c is not limited.

The shield plates 8a to 8c are attached by screws N to stays 7as, 4as, 4bs, 4cs attached to a surface on the second space k2 side of the first partition wall 7a and an inner circumferential surface of the frame 4.

Figure 5:
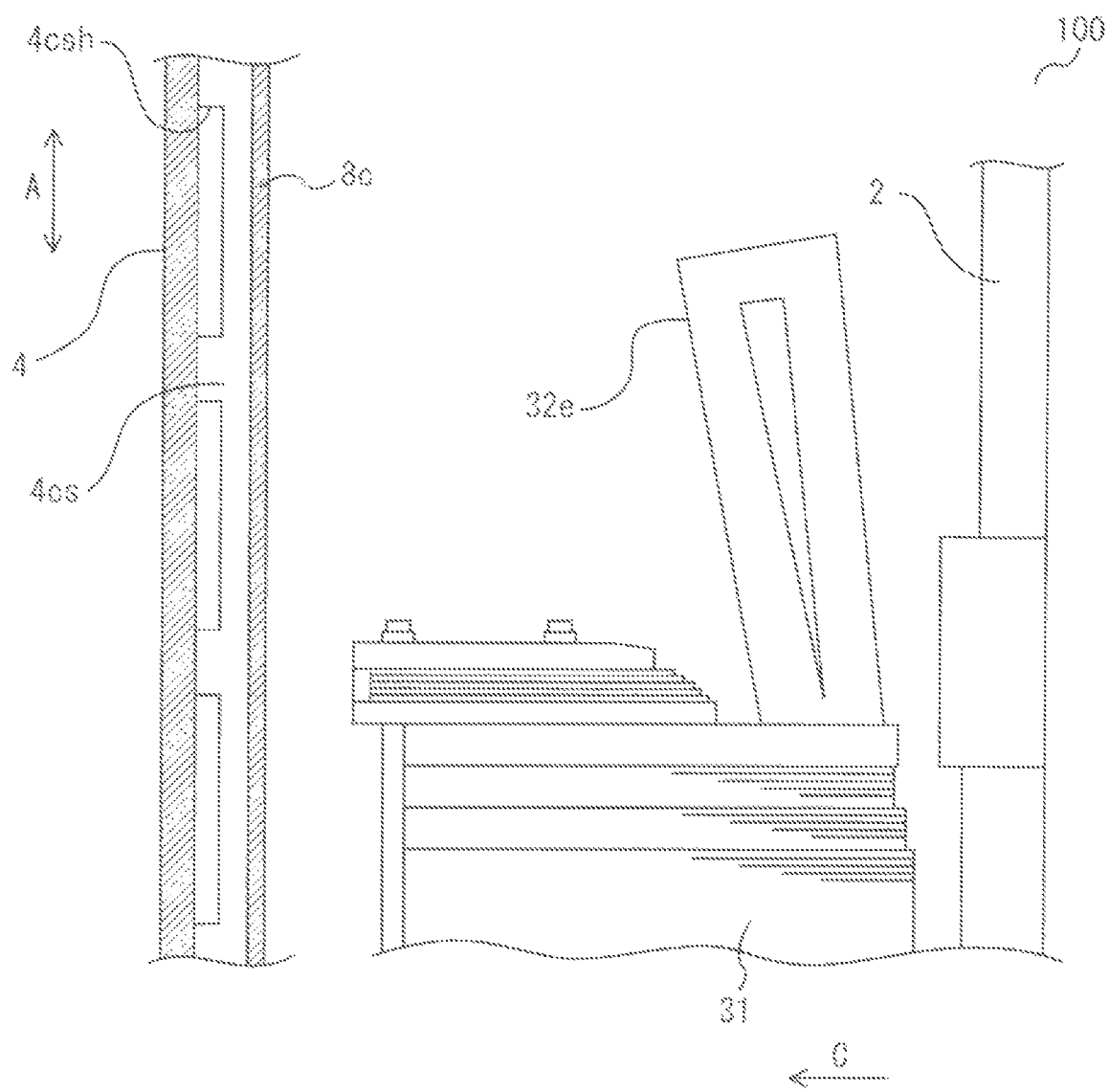
FIG. 5 is a view of a stay according to embodiment 1, is seen in a ventilation path direction in FIG. 2.

FIG. 5 is a view of the stay 4cs as seen in the direction of a ventilation ion path D in FIG. 2.

The stay 4cs has three ventilation ports 4csh that are arranged in the axial direction A and open in the circumferential direction. The stays 4as and 4bs also have similar ventilation ports.

As shown in FIG. 2 and FIG. 4, the ventilation path D is formed between the frame 4 and the shield plates 8a to 8c so as to communicate with the intake port 7ah described above.

Next, operational effects of the intake port 7ah, the ventilation port 4csh, and the like configured as described above will be described. When the rotating electric machine 100 is driven, the rotor 2 rotates and thus a fan 5 attached to an end of the shaft 21 rotates. Then, the cooling gas such as air or hydrogen sealed inside the rotating electric machine 100 circulates through an air gap between the rotor 2 and the stator 3 which are heat generation sources, and ventilation paths (not shown) formed between layers of the respective cores.

Where the pressure of the cooling gas in the second space k2 is denoted by $\alpha$ and the pressure of the cooling gas in the first space k1 is denoted by $\beta$, the pressure of the coding gas is adjusted so as to satisfy $\alpha > \beta$. Thus, the cooling gas in the second space k2 flows from the ventilation port 4csh to pass through the ventilation path D formed between the frame 4 and the shield plates 8a to 8c, and then is sucked to the first space k1 side through the intake port 7ah provided in the first partition wall 7a, so that the cooling gas is cooled by the cooler 6.

At this time, the shield plates 8a to 8c have a high temperature as described above but are forcibly cooled by the cooling gas pausing through the ventilation path D. The cooling gas cooled through boat exchange with the outside toy the cooler 6 circulates again inside the rotating electric machine 100, to take heat away from the stator 3 end the rotor 2, thereby cooling them.

The rotating electric machine according to embodiment 1 includes:
  a rotor having a columnar rotor core which is fixed to a shaft and generates a magnetic field;
  a stator provided so as to surround a circumference of the rotor core, and composed of a stator core and a coil wound through slots of the stator core; and
  a frame storing the stator and the rotor, wherein
  where a space in which a coil end portion of the coil extending in an axial direction from the stator core is surrounded by the frame and an axial-direction end surface of the stator core is defined as an end housing portion,
  the end housing portion is partitioned by a partition plate into a first space on a side where a cooler for cooling a cooling gas circulating in the rotating electric machine is present, and a second space on a side where the coil end portion is present,
  the partition plate has, at a radially outer end, an intake port that opens in a circumferential direction,
  a shield plate which is a magnetically high-conductive metal plate is provided so as to be connected to a radially inner side from the intake port of the partition plate and arranged along the circumferential direction of the frame, and
  a ventilation path is formed between the shield plate and the frame so as to communicate with the intake port.

Thus, the ventilation path is formed between the shield plate and the frame so as to communicate with the intake port for a cooling medium to a cooling device, whereby the shield plate is forcibly cooled. Thus, a rotating electric machine having an enhanced frame cooling effect and a reduced site can be provided.

In addition, in the rotating electric machine according to embodiment 1,
  the shield plate is attached to the frame by a stay, and
  the stay has a ventilation port that opens in the circumferential direction.

Thus, the shield plate can be assuredly fixed to the frame and also the ventilation path can be ensured.

Although the disclosure is described above in terms of an exemplary embodiment, if should be understood that the various features, aspects, and functionality described in the embodiment are not limited in their applicability to the particular embodiment, with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, a dried, or eliminated.

DESCRIPTION OF THE REFERENCE CHARACTERS 100 rotating electric machine
2 rotor 21 shaft
22 rotor core
3 stator
31 stator core
32 coil
32e coil end portion
4 frame
41 end housing portion
4as, 4bs, 4cs, 7as stay
4csh ventilation port
5 fan
6 cooler
7 partition plate
7a first partition wall
7b second partition wall
7ah intake port
8a to 8c shield plate
9 bearing
A axial direction
B circumferential direction
C radial direction
D ventilation path
N screw
k1 first space
k2 second space

The invention claimed is:

1. A rotating electric machine comprising:

a rotor having a columnar rotor core which is fixed to a shaft and generates a magnetic field;

a stator provided so as to surround a circumference of the rotor core, and composed of a stator core and a coil wound through slots of the stator core; and a frame storing the stator and the rotor, wherein where a space in which a coil end portion of the coil extending in an axial direction from the stator core is surrounded by the frame and an axial-direction end surface of the stator core is defined as an end housing portion, the end housing portion is partitioned by a partition plate into a first space on a side where a cooler for cooling a cooling gas circulating in the rotating electric machine is present, and a second space on a side where the coil end portion is present, the partition plate has, at a radially outer end, an intake port that opens in a circumferential direction, a shield plate which is a magnetically high-conductive metal plate is provided so as to be connected to a radially inner side from the intake port of the partition plate and arranged along the circumferential direction of the frame, and a ventilation path is formed between the shield plate and the frame so as to communicate with the intake port.

2. The rotating electric machine according to claim 1, wherein the shield plate is attached to the frame by a stay, and the stay has a ventilation port that opens in the circumferential direction.

* * * * *